US007329110B2

United States Patent
(12) United States Patent
Miyamae

(10) Patent No.: US 7,329,110 B2
(45) Date of Patent: Feb. 12, 2008

(54) TIRE VULCANIZING MOLD AND PNEUMATIC TIRE

(75) Inventor: Naosuke Miyamae, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/555,415

(22) PCT Filed: May 10, 2004

(86) PCT No.: PCT/JP2004/006246

§ 371 (c)(1), (2), (4) Date: Nov. 3, 2005

(87) PCT Pub. No.: WO2004/101247

PCT Pub. Date: Nov. 25, 2004

(65) Prior Publication Data

US 2006/0269636 A1 Nov. 30, 2006

(30) Foreign Application Priority Data

May 13, 2003 (JP) ............................ 2003-134401

(51) Int. Cl.
*B29C 35/02* (2006.01)

(52) U.S. Cl. .................................... 425/46; 152/209.23

(58) Field of Classification Search ................. 425/46, 425/47; 152/209.23
See application file for complete search history.

(56) References Cited

U.S. PATENT DOCUMENTS 4,411,175 A * 10/1983 Takahashi et al. ......... 76/107.1
5,234,326 A * 8/1993 Galli et al. ................... 425/46
5,290,163 A * 3/1994 Katsumata et al. ........... 425/47
5,327,953 A * 7/1994 Ichiki .................... 152/209.25
5,415,826 A * 5/1995 Lange et al. .................. 425/47
6,017,206 A * 1/2000 Soulalioux .................. 425/46
6,382,943 B1 5/2002 Metz et al.

FOREIGN PATENT DOCUMENTS

| | | |
|---|---|---|
| DE | 2 113 698 | 9/1972 |
| EP | 1 447 197 A2 | 8/2004 |
| JP | 11-226961 A | 8/1999 |
| JP | 2002-225034 A | 8/2002 |
| JP | 2003-340835 A | 12/2003 |

* cited by examiner

*Primary Examiner*—James P. Mackey
(74) *Attorney, Agent, or Firm*—Sughrue Mion, Pllc.

(57) ABSTRACT

There is provided a tire vulcanizing mold capable of smoothly and surely forming narrow-width grooves in a treading face without causing the damage, breakage and the like of projections for the formation of the grooves in a sector mold and land portions in the tread, which comprises a plurality of sector molds arranged at predetermined pitches in a circumferential direction and displacing in synchronization with each other in extension and retraction directions to conduct the vulcanization of a tire tread portion, wherein a projection for the formation of the groove formed in an inner surface of each of the sector molds is projected from the inner surface of the sector mold in a direction substantially parallel to a displacing direction of the respective sector mold.

9 Claims, 10 Drawing Sheets

(a)

a –a section a′–a′section (b)

b –b section b′–b′section (c)

c –c section c′–c′section (d)

d –d section d′–d′section (e)

e –e section e′–e′section (f)

f –f section f′–f′section

TIRE VULCANIZING MOLD AND PNEUMATIC TIRE

TECHNICAL FIELD

This invention relates to a tire vulcanizing mold suitable for use in the vulcanization of an off-the-road heavy duty pneumatic tire belonging to a category of construction vehicles and a pneumatic tire vulcanized therethrough. More particularly, it proposes a technique of preventing damage, breakage or the like of a tread forming projection in an inner surface of a sector mold and a land portion formed in the tread portion when the vulcanization of a green tire, particularly the vulcanization of a tread portion thereof is carried out by a plurality of sector molds displacing extendedly and retractively in a radial direction of the tire.

BACKGROUND ART

This type of the heavy duty pneumatic tire is required to have a higher traction performance and a considerably severer durability as compared with tires for truck and bus and tires for light truck, which are run on expressways. For this end, the conventional heavy duty pneumatic tire generally has such a construction of a tread pattern that lug grooves aiming at the improvement of the traction performance are arranged in each side region of the tread and a rib contributing to the improvement of the durability to heat buildup is arranged in a central region of the tread.

In such a construction, however, there is known that as the width of the rib in the central region of the tread is too wide, the deformation of the rib itself can be suppressed to decrease the heat buildup quantity of the rib, but the quantity of frictional energy on a road surface converted to rib deformation energy and others is decreased to lower the wearing life of the rib and hence the tread.

Therefore, there is recently proposed a technique that a block row is arranged in the central region of the tread for the purpose of simultaneously establishing the improvement of the wearing life in the central region and the decrease of the heat buildup quantity and blocks in the block row are defined by grooves having a narrower width as compared with the conventional technique.

According to this technique, the heat buildup at the central region of the tread can be suppressed to a low value by contacting groove walls of the narrow-width groove and hence the mutually adjoining blocks with each other in a ground contact zone of the treading face on the road surface to control the deformation quantity as a whole of the block row, and also the heat dissipation effect at the central region of the tread can be enhanced based on fact that the groove walls of the narrow-width groove are separated away from each other at a zone other than the ground contact zone, and as a result, the thermal deterioration of the central region of the tread can be advantageously prevented.

In addition, the lowering of the friction life in the central region of the tread can be effectively prevented by converting a greater part of friction energy of the treading face on the road surface into a block deformation energy and the like.

However, the thickness of the tread in the heavy duty tire for the off-the-road is very thick, so that it is very difficult to adequately form the narrow-width grooves at the required depth in the tread. For example, the formation of the narrow-width grooves and the like in the treading face of the green tire and the vulcanization of the tread portion are carried out by a plurality of segment-shaped sector molds arranged at predetermined pitches in the circumferential direction of the tread and displacing extendedly and retractively in the radial direction of the tire, there is a problem that when a projection for the formation of the groove arranged in the inner surface of the each sector mold is inserted into the tread portion of the green tire in the radial direction of the tire, the bending, breakage or the like is easily caused in the projection for the formation of the narrow-width groove having a thin thickness and a long projecting length, and even if the insertion of the projection into the green tire is properly conducted, after the completion of the vulcanization to the tread portion, when the each sector mold is displaced extendedly and separated off from the vulcanized tire, the projection for the formation of the narrow-width groove inserted into the treading face in the radial direction is subjected to a large drawing resistance from the vulcanized and cured tire to easily cause the deformation or the like and also the land portion of the tread is easily broken by the projection.

The invention is to solve the above problems of the conventional technique and to provide a tire vulcanizing mold capable of smoothly and surely forming grooves having a narrow width and a deep depth in the treading face without causing the damage, breakage and the like of the projection for the formation of the groove in the sector mold and the land portion of the tread when a tread portion of a large-size heavy duty tire is vulcanized by using the sector molds, and a pneumatic tire vulcanized and shaped therethrough.

DISCLOSE OF THE INVENTION

The invention is a tire vulcanizing mold comprising a plurality of sector molds arranged at predetermined pitches in a circumferential direction and displacing in synchronization with each other in extension and retraction directions to conduct the vulcanization of a tire tread portion, in which a projection for the formation of the groove formed in an inner surface of each of the sector molds is projected from the inner surface of the sector mold in a direction substantially parallel to a displacing direction of the respective sector mold.

In general, the extension and retraction displacements of the sector molds are conducted in a radial direction to a center of a space defined by these sector molds, but the projecting direction of the projection for the formation of the groove arranged in the inner surface of the sector mold is a direction toward the center of the above space for forming the groove directing inward in the radial direction of the tire in a treading face of a product tire, so that there is an angle difference between the extension-retraction direction of the sector mold and the projecting direction of the projection in almost of the sector molds. This angle difference becomes large as a distance from the center position of the inner surface of the sector mold becomes large, and as the number of the sector molds is small and the pitch length of the mold becomes long.

When each of the sector molds is displaced extendedly and retractively in the radial direction in the vulcanization building of the green tire as previously mentioned, the penetration resistance of the projection for the formation of the groove into the green tire tread is increased, so that when the angle difference between the displacing direction of the sector mold and the projecting direction of the projection is large, there is a fear of causing the bending, breakage or the like in the projection for the formation of the groove. Also, this is true in the extension-retraction displacements of the each sector mold after the completion of the vulcanization of the green tire.

Particularly, this fact is significant in the projection for the formation of the groove having a thin thickness and a long projecting length for the formation of the groove having a narrow width and a deep depth.

In the vulcanizing mold according to the invention, the projection contributing to the formation of the groove in the treading face and having at least a thin thickness and a long projecting length is arranged so as to project substantially in parallel to the displacing direction of the sector mold irrespectively of the fact that the groove extends in the circumferential direction of the tread or extends in the widthwise direction of the tread, so that each of the penetration resistance and drawing resistance applied to each of the projections can be largely reduced in the vulcanization building of the green tire through these sector molds, whereby the damage, breakage and the like of the projections and land portions formed in the treading face are effectively prevented.

When the displacing direction of the each sector mold is a radially line segment direction connecting the inner surface of the sector mold to a center of a space defined by these sector molds considering a three-dimensional shape, the projections and the like can be sufficiently protected even when the grooves extending in any direction are formed in the treading face.

The invention is particularly practical when the projecting length of the projection from the inner surface of the sector mold is within a range of 40-180 mm.

When the projecting length is less than 40 mm, the influence of the angle difference between the displacing direction of the sector mold and the projecting direction of the projection is relatively small, while when it exceeds 180 mm, the projection having an extremely thin thickness is difficult to guarantee the smooth penetration because the displacing direction of the sector mold is coincident with the projecting direction of the projection and the strength of the projection is low.

When a circumferential groove continuously extending zigzag in the circumferential direction is formed in the treading face, the projecting direction of the projections formed in the sector molds and butt joined zigzag in the circumferential direction at a contact position between the mutually adjoining sector molds is a direction parallel to an adjusting line segment connecting an intersect between a circumferential line segment connecting centers of the sector molds and a contact edge of the sector mold to the center of the space defined by these sector molds, and the projecting directions of these projections are gradually approximated to the displacing direction of the each sector mold as they are separated away from the contact edge position of the sector mold.

In this case, it is more preferable that the projecting direction of the projection at a position separated from the contact position between the mutual sector molds by not less than 50 mm along a ridge line of the projection is made coincident with the displacing direction of the sector mold.

The circumferential groove continuously extending zigzag in the circumferential direction of the treading face has a component extending in the circumferential direction and a component extending in the widthwise direction of the tread. As to the component extending in the circumferential direction among these components, the projecting direction of the projection in any sector mold is the displacing direction of the sector mold viewing in the widthwise section thereof, and such a projecting direction is a direction common to all of the sector molds, so that it is not necessary to adjust the projecting direction of the projection between the mutually adjoining sector molds as to the component extending in the circumferential direction.

However, considering the component of the circumferential zigzag groove extending in the widthwise direction of the tread, the projecting direction of the projection is a direction parallel to a normal line drawn to the center of the inner surface of the sector mold viewing in a section of each sector mold in the circumferential direction and the projecting directions of the projections are shifted by a quantity corresponding to the pitch between the sector molds in the circumferential direction. As to the component extending in the widthwise direction, therefore, it is necessary to adjust the projecting direction of the projection between the mutually adjoining sector molds. If such an adjustment is not conducted, the circumferential zigzag groove formed in the treading face continues in the circumferential direction on the surface of the tread at the contact position between the sector molds but terminates in portions other than the contact position at a state of separating away from each other in the circumferential direction, so that it is impossible to guarantee the continuity of the circumferential groove.

In the invention, therefore, the projecting direction of the projection at the contact position between the sector molds is made parallel to the aforementioned adjusting line segment for avoiding the occurrence of the above matter, whereby it is made possible to conduct the butt joining between the adjoining sector molds over the whole of the respective projection. On the other hand, as the projecting directions of these projections are separated away from the contact position between the sector molds, they gradually approach to the extendedly and retractively displacing directions of each of the sector molds, and more preferably, the projecting direction of the projection is matched with the displacing direction of the sector mold at a distance separated from the contact position by 50 mm or more along the ridge of the projection, whereby it is possible to form the smooth and sure continuity of the circumferential zigzag groove but also the fear of damaging the projection or the like is advantageously removed.

The feature that the projecting direction of the projection is matched with the displacing direction of the sector mold at the distance separated from the contact position by 50 mm or more is due to the fact that when the distance is less than 50 mm, the uncomfortable feeling is caused at the appearance and hence the lowering of the visual quality is worried.

When the zigzag groove in the treading face is opened to the wide-width lug groove extending in the side region of the tread and when the projection is continued to a large projection for the formation of the lug groove at the distance separated from the contact position between the sector molds by less than 50 mm along the ridge of the projection, the projecting direction of the projection can be made parallel to the adjusting line segment up to the continuing position to the large projection. In this case, the projection can be protected from the damaging or the like by a high rigidity of the large projection.

In the above vulcanizing mold, the pitch number of the sector molds over a full periphery, or the arranging number of the sector molds themselves is preferable to be 12-45.

That is, when the number is less than 12, the influence of the working accuracy of the mold or the like upon the roundness becomes too large and also the difference of angle between the radial direction of the tire and the extension-retraction direction of the sector mold at both ends of the sector mold in the circumferential direction exceeds 15°, which can not ignore the influence upon the tire performances. While, when it exceeds 45, the cost of the mold becomes too expensive and there is a fear of deteriorating the handling operability and the like.

The pneumatic tire according to the invention is a tire vulcanized by the above tire vulcanizing mold. In this tire, a variety of grooves formed in the treading face, particularly grooves having a narrow width can be appropriated without damaging or the like and the functions inherent to these grooves can be developed sufficiently.

BRIEF DESCRIPTION OF THE DRAWINGS

FIG. 6 is a view similar to FIG. 4 showing a discontinuous form of a circumferential groove or the like.

BEST MODE FOR CARRYING OUT THE INVENTION

Embodiments of the invention will be described with reference to the accompanying drawings.

Figure 1:
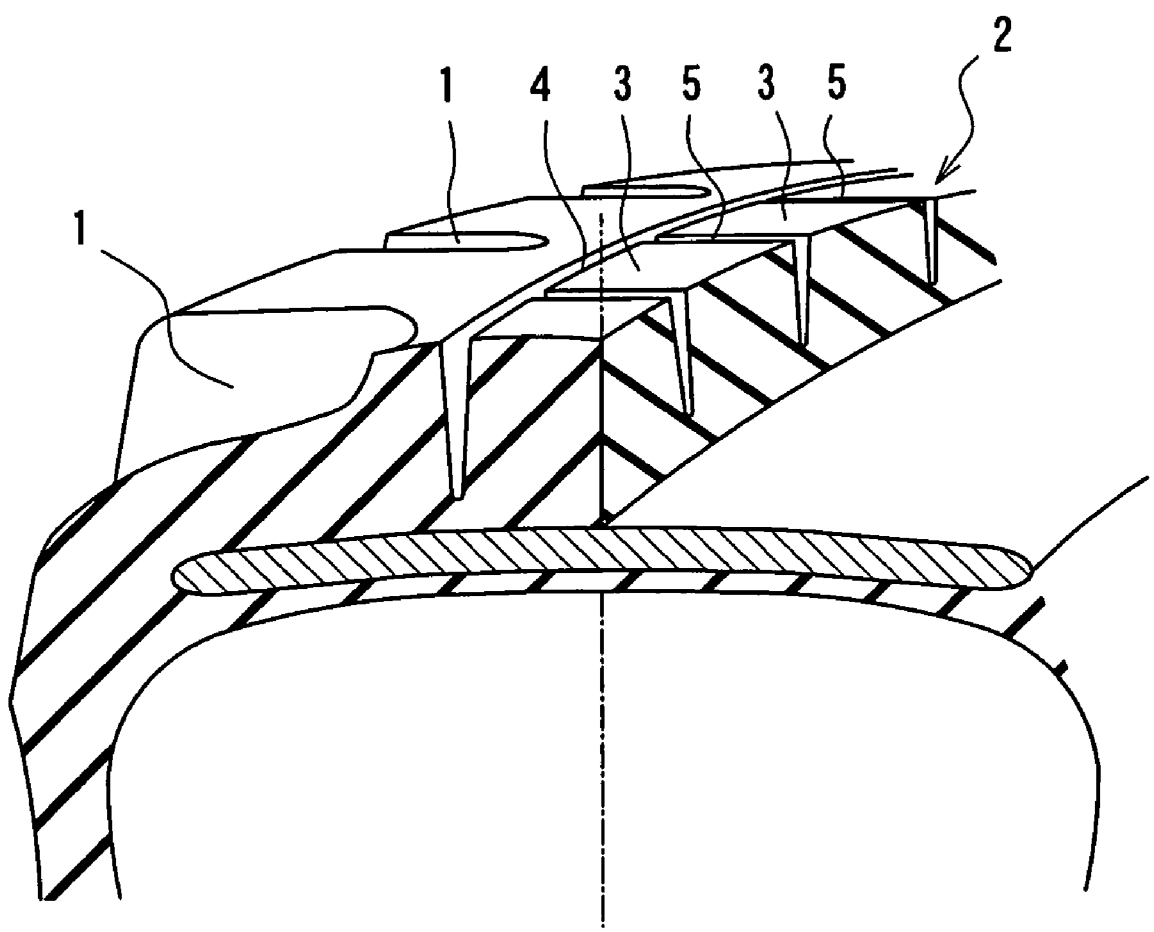
FIG. 1 is a perspective view partly shown in section of a main part of a tire according to the invention.
Figure 2:
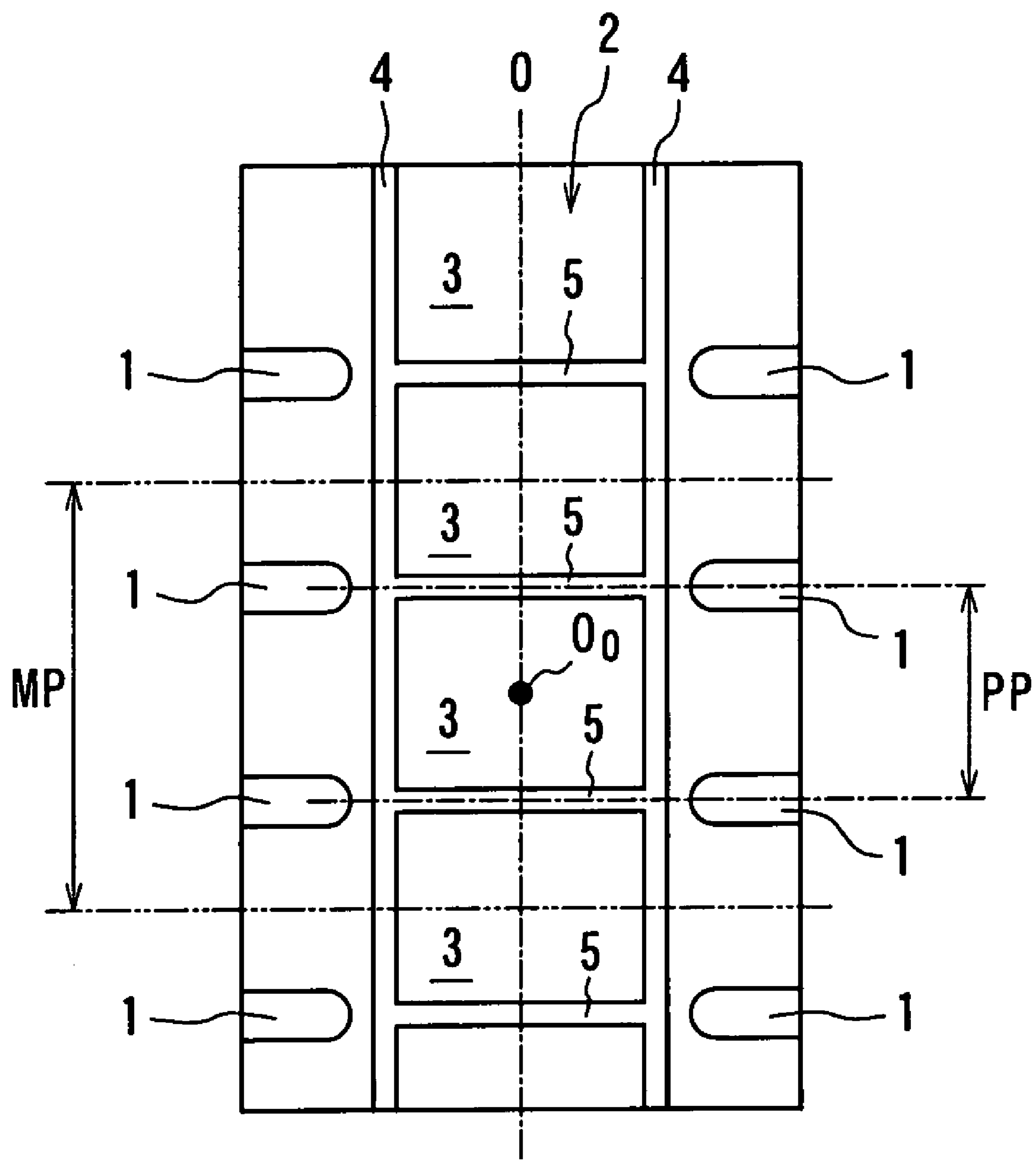
FIG. 2 is a schematically developed view of a tread pattern.

FIG. 1 is a sectional perspective view of a main part of a heavy duty pneumatic tire for the off-the-road according to the invention, and FIG. 2 is a schematically developed view of a tread pattern in such a tire.

In both side regions of a treading face are arranged lug grooves 1 each extending substantially in a widthwise direction thereof, while a block row 2 is arranged in a central region of the treading face, in which each of blocks 3 in the block row 2 is defined by a pair of circumferential straight grooves 4 having a groove width of 2-20 mm and a depth of 40-180 mm and widthwise grooves 5 each communicating the circumferential straight grooves 4 with each other.

The circumferential straight groove 4 extends substantially in parallel to an equator of the tire, and the widthwise groove 5 does not extend over a circumferential pitch MP of a sector mold shown by a phantom line in the figure. Moreover, PP is a pattern pitch of a tread pattern.

When such a tread pattern is formed by projections formed in an inner surface of each of sector molds in the vulcanization of a tread portion through a plurality of sector molds arranged at a given circumferential pitch and displacing in synchronization with each other in extension and retraction directions, the projecting direction of each of these projections is substantially parallel to the extendedly and retractively displacing direction of the respective sector mold.

Figure 3:
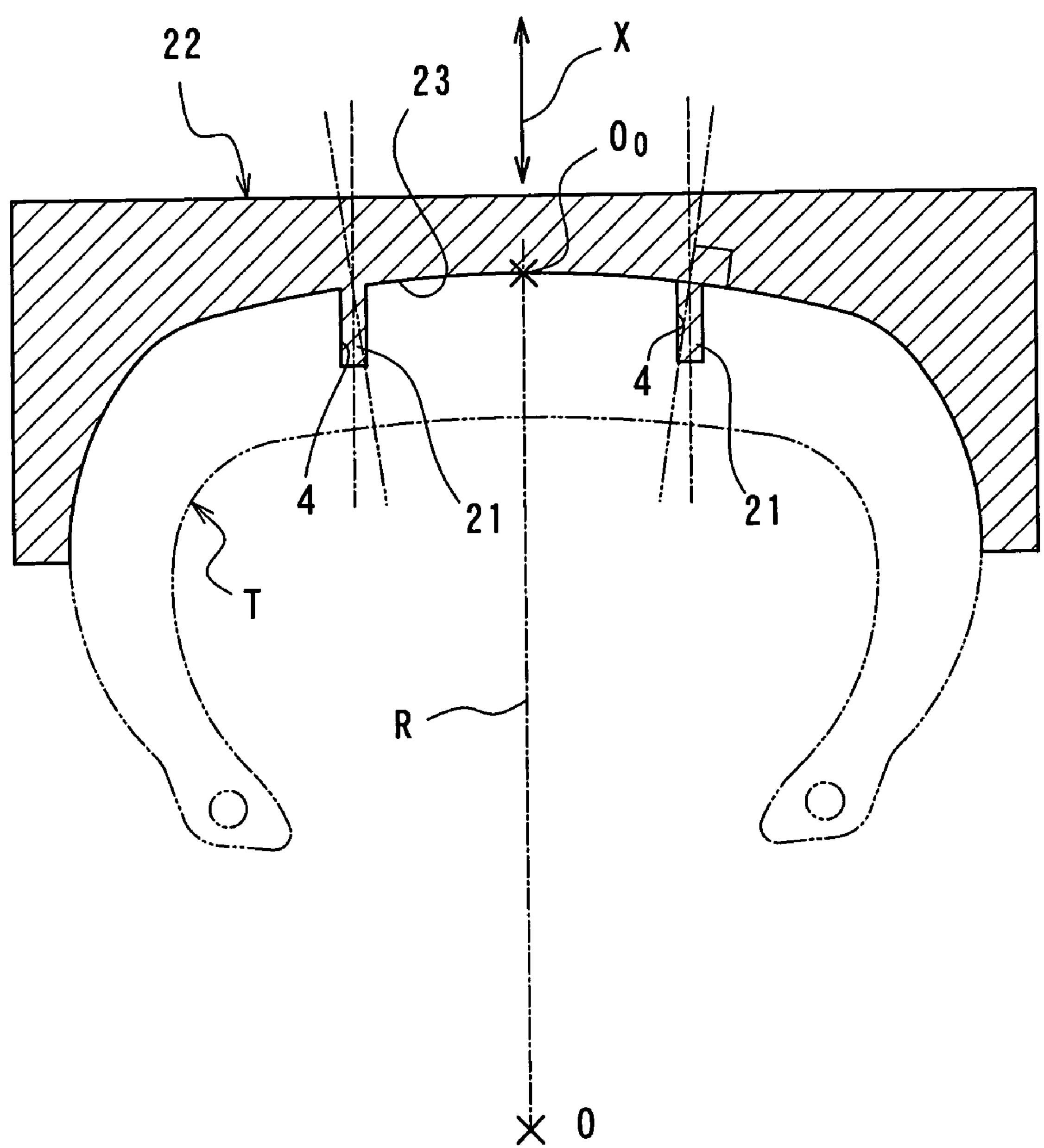
FIG. 3 is a widthwise section view of a sector mold.

Reviewing a projection in a mold for forming the circumferential straight groove 4 continuing in the circumferential direction of the tread, as shown by a widthwise section view of a sector mold in FIG. 3, each of the projections 21 is projectingly formed toward the extendedly and retractively displacing direction X of the sector mold 22, more precisely a direction substantially parallel to a radial line segment R connecting a center $O_0$ of a mold inner surface 23 to a center O of a space bounded by these sector molds 22, and the projecting directions of the projections 21 are common in all of the sector molds 22.

Therefore, the circumferential straight groove 4 formed in the treading face by the projections 21 based on the retraction displacement of the given plural sector molds 22 is continued smoothly and surely over the full periphery of the tread.

The thus formed circumferential straight groove 4 is positioned at a side that a groove bottom portion is located toward a side of the tread as compared with a normal line drawn to the mold inner surface 23 as shown by a phantom line in the figure, or an extending direction of the circumferential straight groove in the section according to the conventional technique. However, this is not a particular disadvantage in this type of the tire.

On the other hand, the projections 21 are substantially parallel to the displacing direction of the mold in all sector molds 22 as shown in the figure, so that the insertion of the each projection 21 into the green tire tread accompanied with the retraction displacement of the each sector mold 22 and the slipping-out of the projection 21 from the tread accompanied with the extension displacement of the sector mold after the completion of the vulcanization can be carried out while minimizing the resistance applied to the projection 21, whereby the damage, breakage and the like of the projection 21 and the land portion of the tread after the vulcanization can be prevented effectively. This is particularly effective when the thickness of the projection 21 is thin and the projecting length thereof is long.

Figure 4:
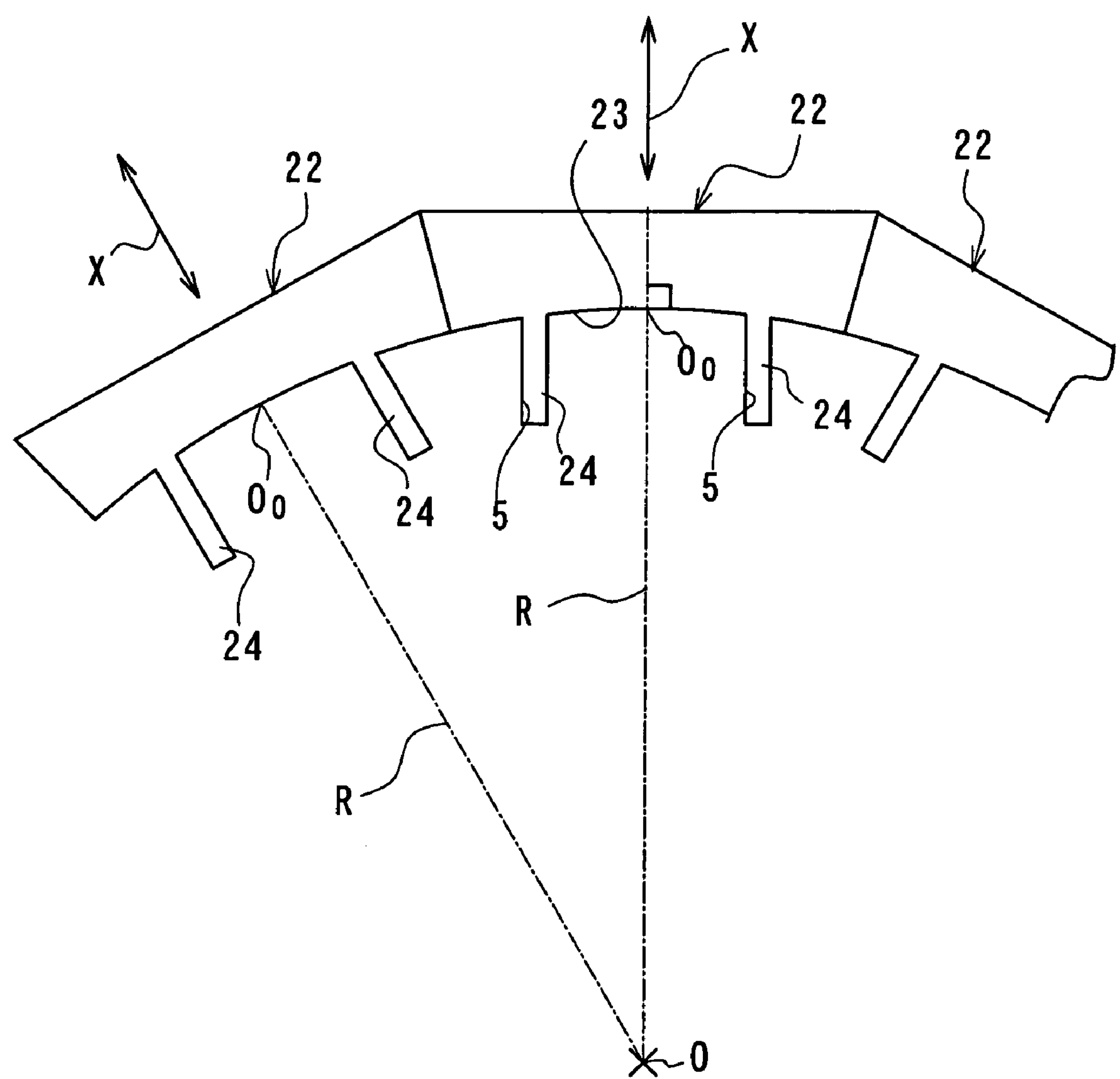
FIG. 4 is a partial section view of sector molds in a circumferential direction.

As to projections in the mold for the formation of widthwise grooves 5 each communicating the thus formed two circumferential straight grooves with each other, as seen from the partial section view of the sector mold at a retracted posture shown in FIG. 4, it is preferable that the projecting direction of each of projections 24 from the inner surface 23 of the mold is rendered into an extending direction of a radial line segment R connecting a center $O_0$ of the inner surface 23 of the mold to a center O of a space defined by the sector molds 22. That is, it is a direction being substantially parallel to the displacing direction X of the mold.

In this case, the relative displacing direction between the adjoining sector molds 22 in the circumferential direction differs only by an angle corresponding to a circumferential pitch MP of the each sector mold 22. This is true in the each projection 24 of the sector mold 22. Such a difference between the sector molds never provides a particular disadvantage in the action of the widthwise grooves 5 formed in the treading face as far as the mold pitch number is not less than 12.

On the other hand, the projection 24 is merely subjected to an extremely small resistance in the extension-retraction displacements of the each sector mold 22 likewise the above case, so that the fear of causing the damage and the like of the projection 24 and others can be effectively removed even when the thickness of the projection 24 is thin and the projecting length thereof is long.

Figure 5:
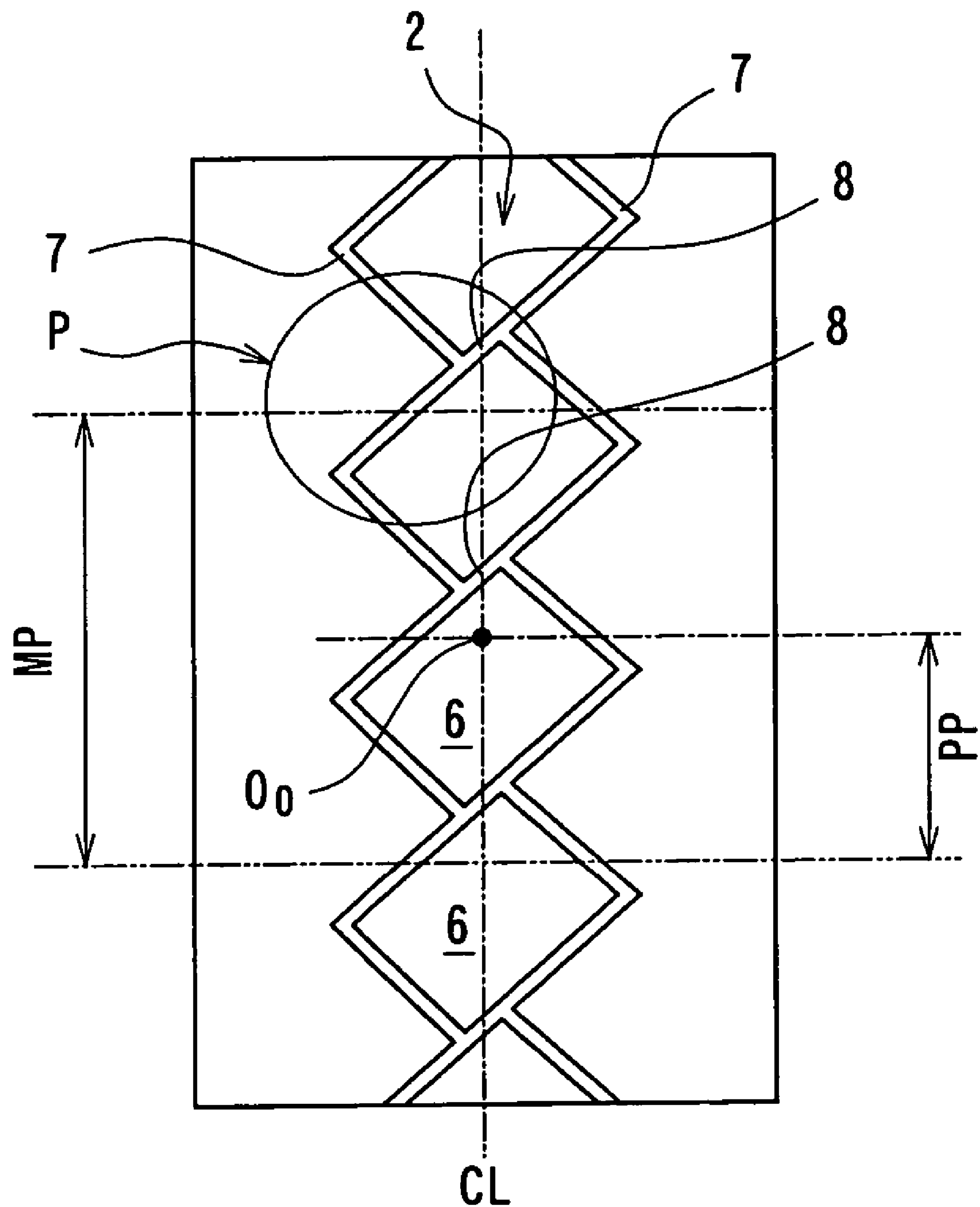
FIG. 5 is a schematically section view of another tread pattern showing only a central region of a tread.

FIG. 5 is a schematically developed view of another tread pattern formed in the treading face showing only a central region of the tread thereof. In this case, each block 6 in a block row 2 at the central region of the tread is defined by a pair of zigzag grooves 7 extending zigzag in the circumferential direction of the tread and a slant groove 8 linearly connecting mutually closed corner parts of both the zigzag grooves 7 to each other, while the slant groove 8 is extended on an extension of the zigzag grooves 7 and upward to the right in the figure.

In this case, each of the grooves 7, 8 has a groove width of 2-20 mm and a depth of 40-180 mm, and the slant groove 8 is not extended over a circumferential pitch MP of the sector mold 22. Moreover, it is preferable that the total number of circumferential pitch MP in the sector molds is 12-45 and the total number of pattern pitch PP is 25-45 and the number of pattern pitch included in the circumferential pitch MP of the sector mold 22 is 1-3. They are true in the tread pattern shown in FIG. 2.

Figure 6:
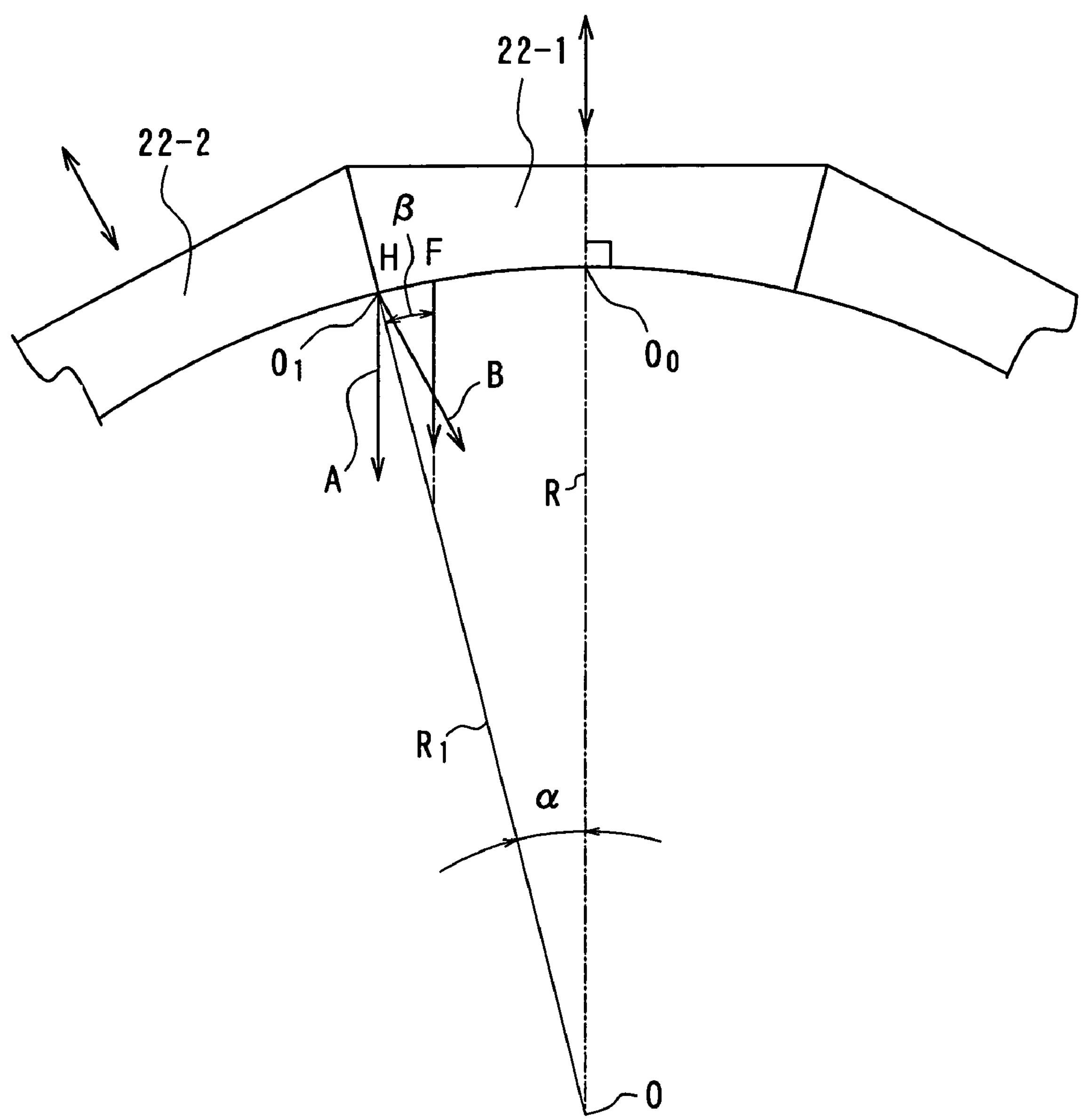

In the above tread pattern, the zigzag groove 7 has an extending component in the circumferential direction but also an extending component in the widthwise direction of the tread, which is different from the circumferential straight groove 4, so that when the projecting direction of the projection for the formation of the zigzag groove 7 is specified to be a direction parallel to the displacing direction of the sector mold 22 as a direction inherent to each of the sector molds 22, as schematically shown at a contact position between two mutually adjoining sector molds 22 by a section view in the circumferential direction in FIG. 6, the projecting direction of at the contact position of the one sector mold 22-1 is a direction shown by an arrow A in the figure, while the projecting direction of the projection in the other sector mold 22-2 is a direction shown by an arrow B. Therefore, the zigzag grooves formed in the treading face by the projections of the respective sector molds 22-1, 22-2 are discontinuous at the contact position between these molds and are impossible to develop a function as a circumferentially continuing groove.

Figure 7:
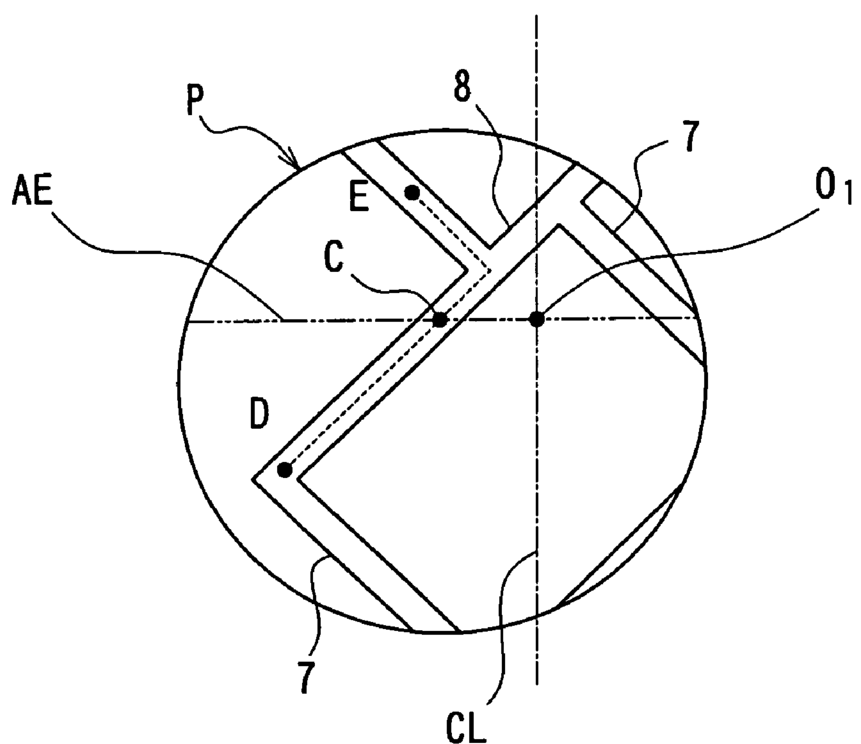
FIG. 7 is a diagrammatic view showing the formation of a projection at a contact edge between molds.

In the invention, therefore, as a portion P of FIG. 5 is enlargedly shown in FIG. 7, the projecting directions of the projections in the respective sector molds 22-1, 22-2 at the contact position between these molds are made a direction parallel to an adjusting line segment $R_1$ connecting an intersect $O_1$ between a peripheral line segment CL connecting centers of inner surfaces of the sector molds and a contact edge AE between the sector molds to a center O of a space defined by these sector molds as shown in FIG. 6.

As a result, the projections for forming a portion of a point C in the zigzag groove 7 shown in FIG. 7 are butt joined on the adjusting line segment $R_1$ over the whole thereof as shown in FIG. 6, whereby the continuity of the zigzag groove 7 in the circumferential direction is ensured.

Figure 8:
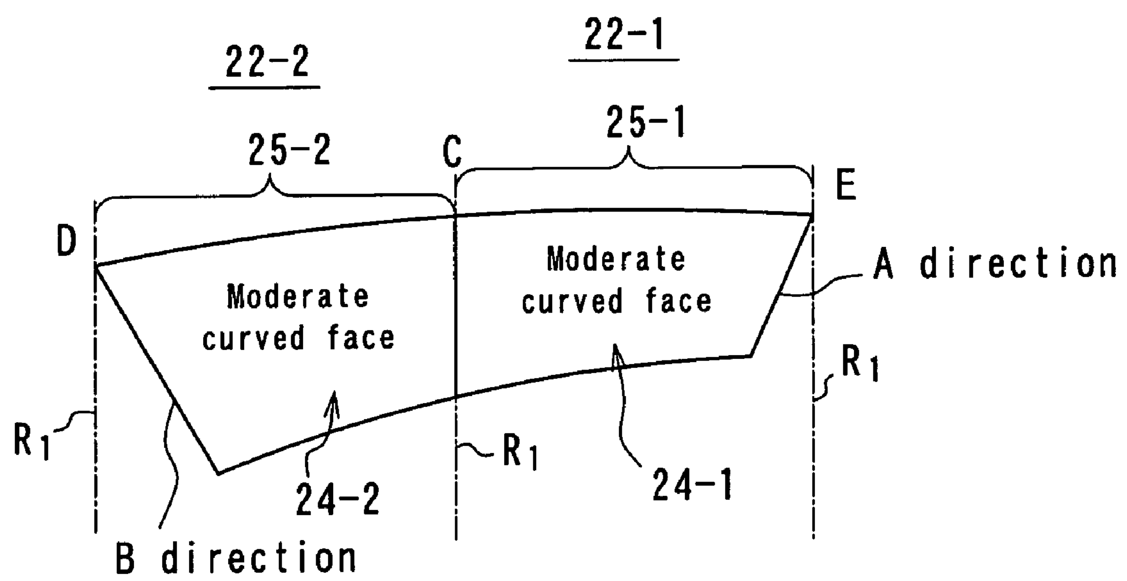
FIG. 8 is a schematic view showing the formation of a projection pinching a contact edge between molds.

On the other hand, in order to sufficiently protect the projections in the mold and the like, it is required that as the projecting directions of the projections go away from the contact position between the respective sector molds 22-1, 22-2, they gradually approach to a direction parallel to the displacing direction of the each mold. For this end, in order that the projecting direction of the projection is made parallel to the displacing direction of the mold at positions corresponding to points D and E of FIG. 7 or positions exceeding 50 mm from the point C as measured along a ridge of the projection, as schematically shown in FIG. 8, the respective projections 24-1, 24-2 gradually approach from the butt joining position corresponding to the point C through moderate curved face portions 25-1, 25-2 to the direction parallel to the displacing direction of the mold and finally are given parallel directions at the points D, E.

Moreover, the position that the projecting directions of the projections 24-1, 24-2 are just parallel to the displacing directions of the sector molds 22-1, 22-2 is made more than 50 mm measured along the ridge of the projection in order to remove the uncomfortable feeling of the appearance even when considering a maximum distortion quantity of the projection.

Figure 9:
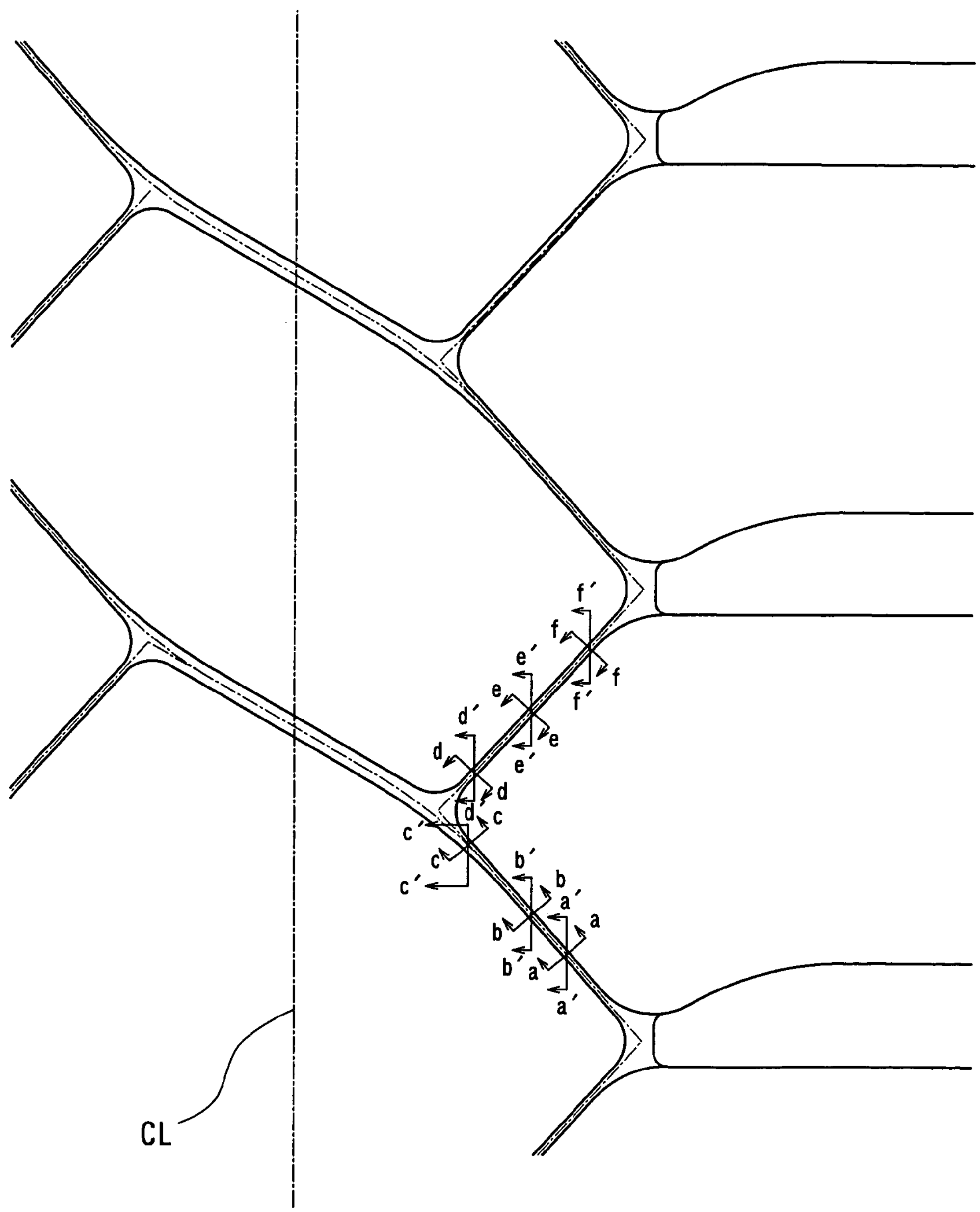
FIG. 9 is a partial developed plan view of projections in a mold.
Figure 10:
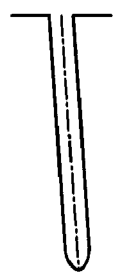
FIG. 10 is a section view of a projection at various positions.
Figure 10:
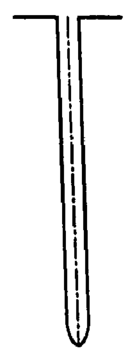
Figure 10:
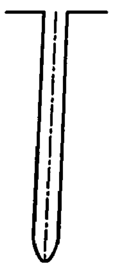
Figure 10:
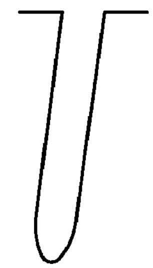
Figure 10:
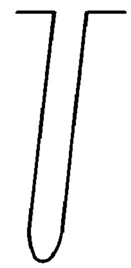
Figure 10:
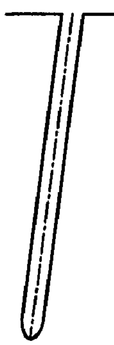
Figure 10:
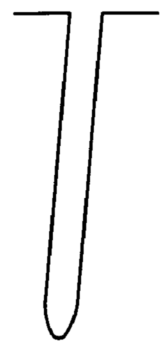
Figure 10:
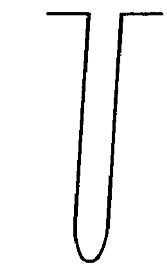

FIG. 9 is a developed plan view of the projections formed in the sector molds for the formation of grooves as mentioned above, and FIG. 10 is cross-sectional views of the projection and section views on the line segment parallel to the peripheral line segment at various positions of the projection, respectively.

Figure 11:
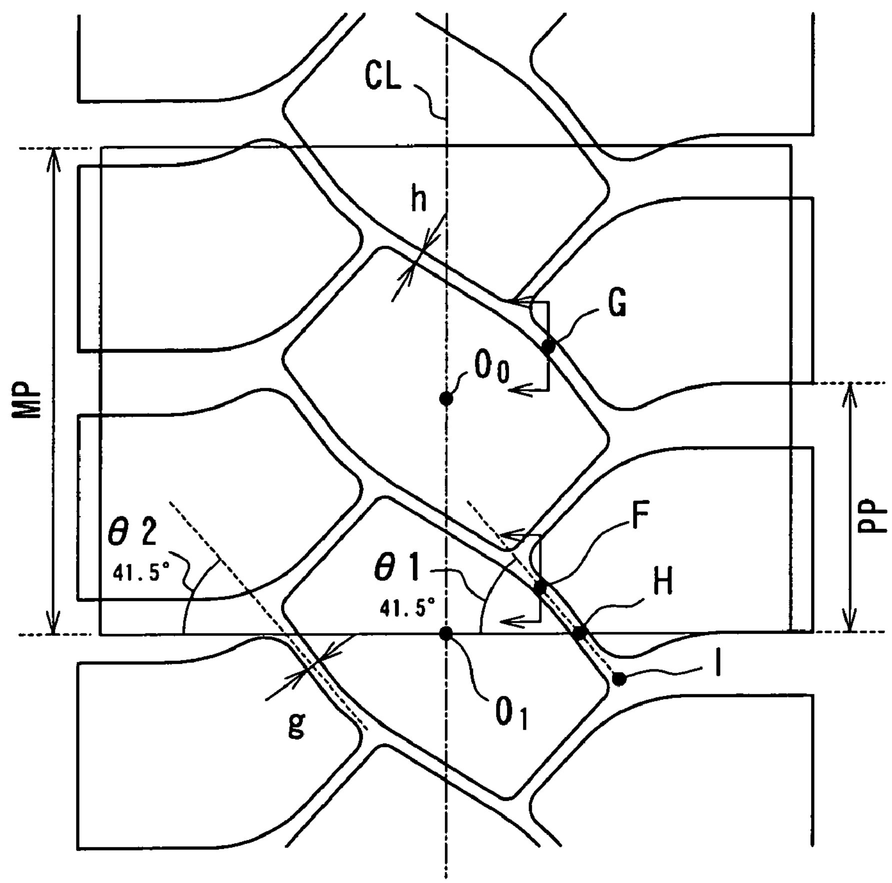
FIG. 11 is a developed view of a tread pattern formed by the vulcanizing mold according to the invention.

According to the above-mentioned manner, a large-scale off-the-road tire having a high general-versatility and a size of 4000R57 E4 (deep groove), in which a treading face has a tread pattern as shown by a developed view in FIG. 11 and a block row between a pair of zigzag grooves continuing in a circumferential direction and dimensions shown in Table 1, is built under vulcanization by means of a vulcanizing mold having the aforementioned constructed projections and dimensions shown in Table 1.

TABLE 1

| | Vulcanizing mold | Product |
|---|---|---|
| Tire size | 40.00R57 | 40.00R57 |
| Tire outer diameter mm | 3.570 | 3.575 |
| Tire width mm | 1,158 | 1,145 |
| Tire tread width mm | 1,045 | 1,044 |
| Groove depth mm | 101 | 97 |
| Crown R mm | — | 2,300 |
| Fine groove width | | |
| g mm | 41.5 | — |
| h mm | 41.5 | — |
| Fine groove angle | | |
| θ1° | 41.5 | — |
| θ2° | 41.5 | — |
| Pattern pitch number | 36 | 36 |
| Mold pitch number | 18 | 18 |
| Pattern pitch number included one mold pitch | 2 | 2 |
| Approved rim | — | 29.00/6.0 |
| Load mass kg | — | 60000 |
| Air pressure filled kPa | — | 700 |

Figure 12:
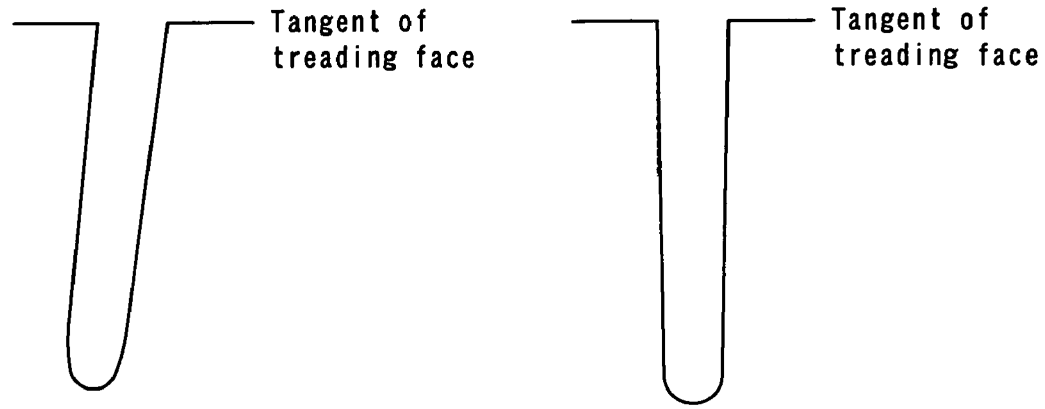
FIG. 12 is a section view of a zigzag groove based on a treading face.

In this case, the projection for the formation of the fine groove included in the circumferential pitch MP of the sector mold is directed to a direction parallel to a radial line segment connecting a center $O_0$ of the inner surface of the mold to a center of a space defined by the molds, while the extension-retraction displacing direction of the sector mold is a direction of the radial line segment. As sectional shapes at positions of points F and G of the zigzag groove formed by such a vulcanizing mold based on a tangent drawn to the treading face are shown in FIGS. 12(*a*) and (*b*), they take substantially a vertical shape at the point G near to the center $O_0$ and a relatively large oblique shape at the point F separated away from the center $O_0$.

At a point H on the contact edge between the molds, the groove in its depth direction extends in a direction substantially parallel to the adjusting line segment connecting the aforementioned intersect $O_1$ to the center of the space as mentioned above to guarantee the continuity of the zigzag groove in the circumferential direction. The points H, F and I are continued through smooth curved faces.

Moreover, an angle defined between the radial line segment connecting the center $O_0$ to the space center and the adjusting line segment connecting the intersect $O_1$ to the space center (see "α in FIG. 6) is (360°/mold pitch number/2), and in case of the mold pitch number (18) shown in Table 1, the angle is 10° calculatedly. Therefore, when the zigzag groove in its depth direction precisely extends in the direction parallel to the radial line segment at the point F and in the direction parallel to the adjusting line segment at the point H, an angle of an extended line segment in the depth direction defined between both the points (see "β in FIG. 6) is also 10°, but the angle in the actual arrangement of the zigzag groove is 7.2°.

Although the above is described with respect to the case that the tread pattern shown in FIG. 11 is formed by using the aforementioned vulcanizing mold according to the invention, when the distance of the ridge from the contact edge between the molds as shown by H-I in the figure is as short as less than 50 mm and the groove is opened to the wide-width lug groove at the point I, the extension form in the depth direction of the groove may be maintained in the same direction as the projecting direction at the point H parallel to the adjusting line segment without adjusting between H and I.

INDUSTRIAL APPLICABILITY

According to the invention, when the block row defined by the narrow-width grooves is formed in the central region of the tread for the purpose of providing the high wear resistance of the heavy duty pneumatic tire for off-the-road, the damage, breakage and the like of the projections in the mold and the land portions defined by the projections can be prevented effectively, which is particularly conspicuous when the mold pitch number is decreased to reduce the cost of the vulcanizing mold.

Also, the necessary continuity can be surely given to the grooves extending in the direction crossing obliquely to the contact edge between the sector molds, so that it is possible to largely enhance the degree of freedom in the design of the tread pattern and sufficiently accept the adoption of tread patterns having a complicated construction.

The invention claimed is:

1. A tire vulcanizing mold comprising a plurality of sector molds arranged at predetermined pitches in a circumferential direction and displacing in synchronization with each other in extension and retraction directions to conduct the vulcanization of a tire tread portion, in which at least a portion of a projection for the formation of a groove formed in an inner surface of each of the sector molds is formed away from the circumferential center of the sector mold and is projected from the inner surface of the sector mold in a direction substantially parallel to a displacing direction of the respective sector mold.

2. A tire vulcanizing mold according to claim 1, wherein the displacing direction of the each sector mold is a radially line segment direction connecting a center of the inner surface of the sector mold to a center of a space defined by these sector molds.

3. A tire vulcanizing mold according to claim 1, wherein the projecting length of the projection from the inner surface of the sector mold is within a range of 40-180 mm.

4. A tire vulcanizing mold according to claim 1, wherein the projections are slanted with respect to the circumferential direction at a contact position between the mutually adjoining sector molds and wherein the projection direction of the projections at the contact position is a direction parallel to an adjusting line segment connecting an intersect between a circumferential line segment connecting centers of the sector molds and a contact edge of the sector mold to the center of the space defined by these sector molds, and the projecting directions of these projections are gradually approximated to the displacing direction of the each sector mold as they are separated away from the contact edge position of the sector mold.

5. A tire vulcanizing mold according to claim 4, wherein the projecting direction of the projection at a position separated from the contact position between the mutual sector molds by not less than 50 mm along a ridge line of the projection is made coincident with the displacing direction of the sector mold.

6. A tire vulcanizing mold according to claim 1, wherein the projections are slanted with respect to the circumferential direction at a contact position between the mutually adjoining sector molds and wherein the projection direction of the projections at the contact position is a direction parallel to an adjusting line segment connecting an intersect between a circumferential line segment connecting centers of the sector molds and a contact edge of the sector mold to the center of the space defined by these sector molds, the projection becomes larger for the formation of a lug groove at the distance separated from the contact position between the sector molds by less than 50 mm along the ridge of the projection and the projection direction for the projection at the distance separated from the contact position between the sector molds by less than 50 mm is a direction parallel to the adjusting line segment up to the continuing position to the distance separated from the contact position between the sector molds by less than 50 mm, and the projection is gradually approximated to the displacing direction of the each sector mold as they are separated away from the contact edge position of the sector mold.

7. A tire vulcanizing mold according to, claim 1, wherein the pitch number of the sector molds over a full periphery is 12-45.

8. A pneumatic tire vulcanized by a tire vulcanizing mold as claimed in claim 1.

9. A tire vulcanizing mold comprising a plurality of sector molds arranged at predetermined pitches in a circumferential direction and displacing in synchronization with each other in extension and retraction directions to conduct the vulcanization of a tire tread portion, in which a projection for the formation of a groove formed in an inner surface of each of the sector molds is formed away from a center of the sector mold in the circumferential direction of the sector mold and is projected from the inner surface of the sector mold in a direction parallel to a displacing direction of the respective sector mold.

* * * * *